United States Patent Office 3,222,408
Patented Dec. 7, 1965

3,222,408
PREPARATION OF ETHYLENE DICHLORIDE
Harry Smith, Northwich, England, assignor to Imperial Chemical Industries Limited, London, England, a corporation of Great Britain
No Drawing. Filed May 13, 1963, Ser. No. 280,100
Claims priority, application Great Britain, May 16, 1962, 18,884/62
1 Claim. (Cl. 260—659)

This invention relates to a new method of making ethylene dichloride and particularly to one in which it is not necessary to supply elementary chlorine to the reaction system.

Ethylene dichloride, $CH_2Cl \cdot CH_2Cl$, is usually made by the direct combination of ethylene and elementary chlorine. In the process of the invention the chlorine required comes from a metal chloride. By including air or oxygen in the reaction system the metal chloride in giving up chlorine to the ethylene is oxidised to the oxide corresponding to the chloride. This oxide may subsequently be converted back into the corresponding chloride by known methods, and the chloride used again as a source of chlorine. Anhydrous ferric chloride is the preferred metal chloride, either alone or mixed with other anhydrous metal chlorides.

The mixture of chlorides is conveniently supported on a porous, inactive material in granular form having a large surface area and consisting for example of silica or alumina or other siliceous or aluminiferous compounds. The granules may be in the form of a fixed bed or layer, through or over which the mixture of ethylene and air or oxygen is passed, or they may be agitated or circulated or fluidised.

The process of the invention can if desired form one stage of a cyclic process in other stages of which the ferric oxide formed in the reaction between ethylene and oxygen and ferric chloride is reacted with chlorine-containing compound, for example, ammonium chloride or hydrogen chloride, to regenerate ferric chloride.

The invention is illustrated by examples arranged in the table given below. In each experiment 20 g. of a ferric chloride/potassium chloride/cupric chloride mixture was supported on silica granules of 0.50 to 1.0 mm. size in a fixed bed 8 cms. deep. The relative proportions of the chlorides were such that one g. atom of Fe was associated with one of K and 0.3 of Cu. The air flow was 59 cc./minute in Examples 1, 2, 3, 4 and 7, and 89 cc./minute in Examples 5 and 6. In each experiment the ethylene flow was 23.7 cc./minute and the duration was 30 minutes.

| Expt. | Temp., °C. | $FeCl_3$ decomposed, percent | Products expressed as percent Cl lost by $FeCl_3$ | | | Products expressed as percent ethylene used | | |
|---|---|---|---|---|---|---|---|---|
| | | | $C_2H_4Cl_2$ | Other chloro hydrocarbons | HCl | $C_2H_4Cl_2$ | Other chloro hydrocarbons | $CO_2$ |
| 1 | 250 | 76.9 | 92.2 | nil | 3.6 | 66.8 | nil | nil |
| 2 | 300 | 75.9 | 71.8 | 5.6 | 14.1 | 56.6 | 1.0 | nil |
| 3 | 350 | 75.9 | 41.3 | 7.9 | 28.8 | 28.7 | 8.4 | 4.9 |
| 4 | 400 | 67.9 | 11.6 | 18.3 | 48.3 | 7.5 | 16.9 | 6.7 |
| 5 | 250 | 81.5 | 87.0 | nil | 2.3 | 67.3 | nil | 0.3 |
| 6 | 300 | 80.5 | 72.7 | 14.4 | 19.9 | 56.8 | 9.0 | 5.9 |
| 7 | 350 | 80.4 | 40.8 | 9.9 | 31.5 | 31.5 | 9.7 | 4.3 |

According to my invention a process for making ethylene dichloride comprises heating a mixture of dry ethylene and dry air or dry oxygen with anhydrous ferric chloride.

The reaction proceeds at temperatures from 250° C. to 400° C. and even higher, but only at the lower end of this range are yields good. At the higher temperatures the degree of conversion of ethylene is less, the proportion of ethylene oxidised to carbon dioxide and therefore lost is greater, and considerable amounts of hydrogen chloride are produced as well as other chlorohydrocarbons. Thus the preferred temperature range is from 250° to 300° C.

Whilst the reaction will proceed with ferric chloride alone, the presence of other metal chlorides, particularly potassium chloride and cupric chloride, in the ferric chloride improves both reaction rate and yield of ethylene dichloride. A suitable mixture would contain, per gram atom of Fe, from 0.8 to 1.2 gram atoms of K and 0.2 to 0.4 gram atoms of Cu.

What I claim is:

A process for making ethylene dichloride comprising contacting a mixture consisting essentially of dry ethylene and dry air with a mixture of anhydrous ferric, potassium and cupric chlorides at 250° C.–300° C., said mixture of metal chlorides containing per gram atom of iron from 0.80 to 1.2 gram atoms of potassium and from 0.20 to 0.40 gramme atoms of copper.

References Cited by the Examiner

UNITED STATES PATENTS

| 5 | 1/1864 | Clark | 260—659 |
| 2,575,167 | 11/1951 | Fontana et al. | 260—659 |
| 2,838,577 | 6/1958 | Cook et al. | 260—659 |

FOREIGN PATENTS

| 167,846 | 11/1953 | Australia. |
| 451,379 | 9/1948 | Canada. |

LEON ZITVER, *Primary Examiner.*